US012715348B2

United States Patent
Edwards

(10) Patent No.: US 12,715,348 B2
(45) Date of Patent: Aug. 25, 2026

(54) JUVENILE SEAT ATTACHMENT TO VEHICLE SEAT

(71) Applicant: Dorel Juvenile Group, Inc., Foxboro, MA (US)

(72) Inventor: Timothy L. Edwards, Columbus, IN (US)

(73) Assignee: Dorel Juvenile Group, Inc., Foxboro, MA (US)

( * ) Notice: Subject to any disclaimer, the term of this patent is extended or adjusted under 35 U.S.C. 154(b) by 264 days.

(21) Appl. No.: 18/418,412

(22) Filed: Jan. 22, 2024

(65) Prior Publication Data

US 2024/0246459 A1 Jul. 25, 2024

Related U.S. Application Data

(60) Provisional application No. 63/440,163, filed on Jan. 20, 2023.

(51) Int. Cl.
*B60N 2/28* (2006.01)

(52) U.S. Cl.
CPC ......... *B60N 2/2806* (2013.01); *B60N 2/2816* (2023.08)

(58) Field of Classification Search
CPC ...... B60N 2/28; B60N 2/2803; B60N 2/2806; B60N 2/2812; B60N 2/2816; B60N 2/2818; B60N 2/2821
See application file for complete search history.

(56) References Cited

U.S. PATENT DOCUMENTS 7,201,452 B1 * 4/2007 Franks ................. B60N 2/2803 297/253
8,419,129 B2 * 4/2013 Inoue ................... B60N 2/2806 297/256.16
8,845,022 B2 * 9/2014 Strong ..................... B60N 2/75 297/256.16
9,403,449 B2 * 8/2016 Longenecker ....... B60N 2/2806
10,189,381 B2 * 1/2019 Williams ............... B60N 2/265
10,406,947 B2 * 9/2019 Anderson .............. B60N 2/286
11,584,267 B2 * 2/2023 Longenecker ....... B60N 2/2821
12,286,039 B2 * 4/2025 Dingman ............. B60N 2/2875
2016/0347210 A1 * 12/2016 Mason ................. B60N 2/2821
2016/0347212 A1 * 12/2016 Mason ................. B60N 2/2821
2018/0056822 A1 * 3/2018 Anderson ............ B60N 2/2821
2018/0345827 A1 * 12/2018 Anderson ............ B60N 2/2806
2022/0105836 A1 * 4/2022 Messner .............. B60N 2/2806

* cited by examiner

*Primary Examiner* — Chi Q Nguyen
(74) *Attorney, Agent, or Firm* — Barnes & Thornburg LLP

(57) ABSTRACT

A child restraint is configured to be attached to a vehicle seat to retain the child restraint to the vehicle seat. The child restraint includes a seat base adapted to rest on the vehicle seat and a juvenile seat adapted to hold a child and configured to be attached removably to the seat base. The seat base is formed to include a belt path defined at least partially by a belt-engagement surface and having a first end and an opposite, second end. The child restraint further includes an attachment strap configured to secure the seat base to the vehicle seat to retain the seat base and the juvenile seat to the vehicle seat.

20 Claims, 7 Drawing Sheets

JUVENILE SEAT ATTACHMENT TO VEHICLE SEAT

PRIORITY CLAIM

This application claims priority under 35 U.S.C. § 119(e) to U.S. Provisional Patent Application No. 63/440,163, filed Jan. 20, 2023, which is expressly incorporated by reference herein in its entirety.

BACKGROUND

The present disclosure relates to attachment systems, and particularly to an attachment system for a child restraint. More particularly, the present disclosure relates to a child restraint and an attachment system for the child restraint to attach the child restraint to a vehicle seat.

SUMMARY

According to the present disclosure, a child restraint is configured to attach to a vehicle seat to retain the child restraint to the vehicle seat. The child restraint includes a seat base adapted to rest on the vehicle seat and a juvenile seat adapted to hold a child and configured to be attached removably to the seat base.

In illustrative embodiments, the seat base includes a seat base foundation and a tension indicator. The seat base foundation is formed to include a belt path defined at least partially by a belt-engagement surface and having a first end and an opposite, second end. The tension indicator includes at least one retractable protrusion positioned within the belt path between the first and second ends of the belt-engagement surface.

In illustrative embodiments, the child restraint further includes an attachment strap configured to secure the seat base to the vehicle seat to retain the seat base and the juvenile seat to the vehicle seat. The attachment strap includes an anchor belt configured to engage the belt engagement surface, a first anchor coupled to an end of the anchor belt, and a second anchor coupled to the anchor belt. The first and second anchors are configured to engage with a first latch point and a second latch point included in the vehicle seat, respectively. The second anchor includes an attachment hook having an engagement surface configured to contact and grip the second latch point and an adjustment buckle coupled with the anchor belt to change a length of the anchor belt between the first anchor and the second anchor to allow tightening and loosening of the anchor belt relative to the first and second anchors.

In illustrative embodiments, the anchor belt is configured to engage the retractable protrusion and cause the retractable protrusion to change from an extended position to a retracted position after attachment of the first anchor to the first latch point and the second anchor to the second latch point and after tightening the anchor belt to exert a predetermined pressure on the belt-engagement surface. The second anchor has a maximum length defined from the engagement surface of the attachment hook to an exit point on the adjustment buckle where the anchor belt exits the adjustment buckle and extends toward the second end of the belt-engagement surface. The maximum length is less than a distance defined from the belt-engagement surface at the retractable protrusion to the second latch point so that the anchor belt contacts and depresses the retractable protrusion when the attachment strap is installed.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIG. 1 is a perspective view of a child restraint including an attachment strap configured to attach and secure the child restraint to a pair of latch points included in a vehicle seat, the child restraint further including a juvenile seat adapted to hold a child and a seat base configured to rest on the vehicle seat and formed to include a belt path defined at least partially by a belt-engagement surface used by the attachment strap to retain the seat base to the vehicle seat;

FIG. 2 is a perspective view of the attachment strap showing that the attachment strap includes an anchor belt configured to engage the belt-engagement surface of the seat base, a first anchor coupled to a first end of the anchor belt and configured to attach to a first latch point included in the vehicle seat, as shown in FIG. 3B, and a second anchor coupled to the anchor belt and including an attachment hook configured to attach to a second latch point included in the vehicle seat, as shown in FIG. 3B, and an adjustment buckle coupled directly with the attachment hook and configured to engage the anchor belt to allow movement of the anchor belt relative to the second anchor for tightening and loosening of the anchor belt across the belt-engagement surface;

FIG. 3A is an enlarged view of a portion of the seat base and attachment strap from FIG. 1 showing the anchor belt depressing a retractable protrusion included in the seat base and used to indicate when proper tension is present in the anchor belt, and showing that the second anchor is sized and structured so as not to interfere with operation of the retractable protrusion and/or other functions of the child restraint;

FIG. 3B is a top plan view of the attachment strap attached to the first and second latch points included in the vehicle seat;

FIG. 4 is a side elevation view of a portion of the child restraint showing the second anchor attached to the second latch point and showing that the second anchor includes a maximum length that is less than a distance from the retractable protrusion to the second anchor to position an exit point of the anchor belt from the adjustment buckle closer to the second anchor than the retractable protrusion and/or any point along the belt-engagement surface so that the anchor belt can depress the retractable protrusion when the attachment strap is installed without interference from the adjustment buckle;

FIG. 5A is an enlarged view of the second anchor showing that the anchor belt is routed around a guide post included in the adjustment buckle and an axis established by the guide post, and showing that the attachment hook includes a curvature about a hook curvature axis that is substantially perpendicular to the axis of the guide post to cause the adjustment buckle to rest flat against a lateral side of the seat base when the attachment strap is installed, as shown in FIG. 4, so that the anchor belt is installed without any twists or bunches;

Figure 6:
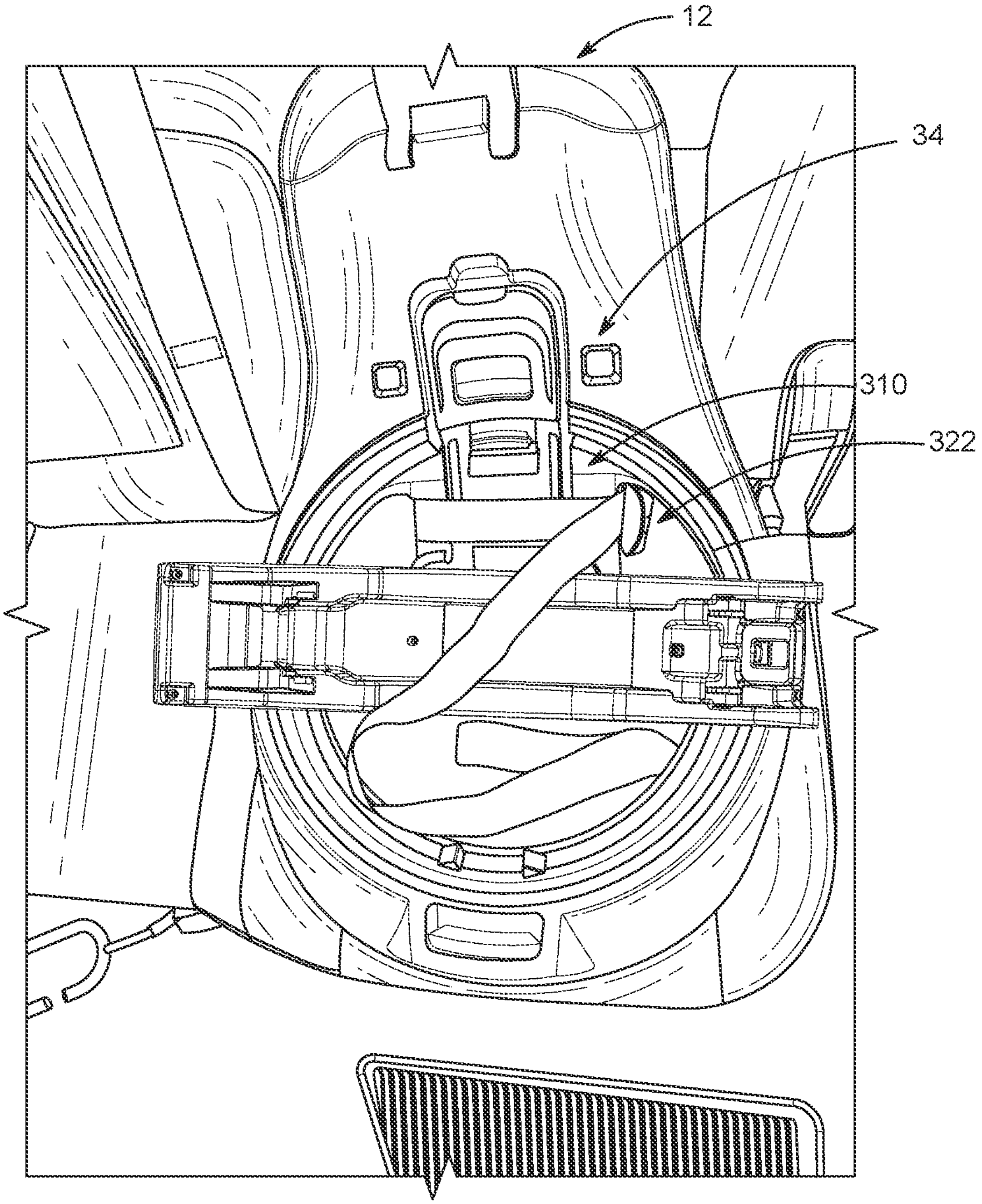
FIG. 6 is a perspective view of the seat base from FIG. 1 attached to the vehicle seat with a comparative attachment strap that includes different anchors from the attachment strap of FIGS. 1-5B and that interferes with operations of the child restraint, as suggested in FIGS. 7 and 8.
Figure 7:
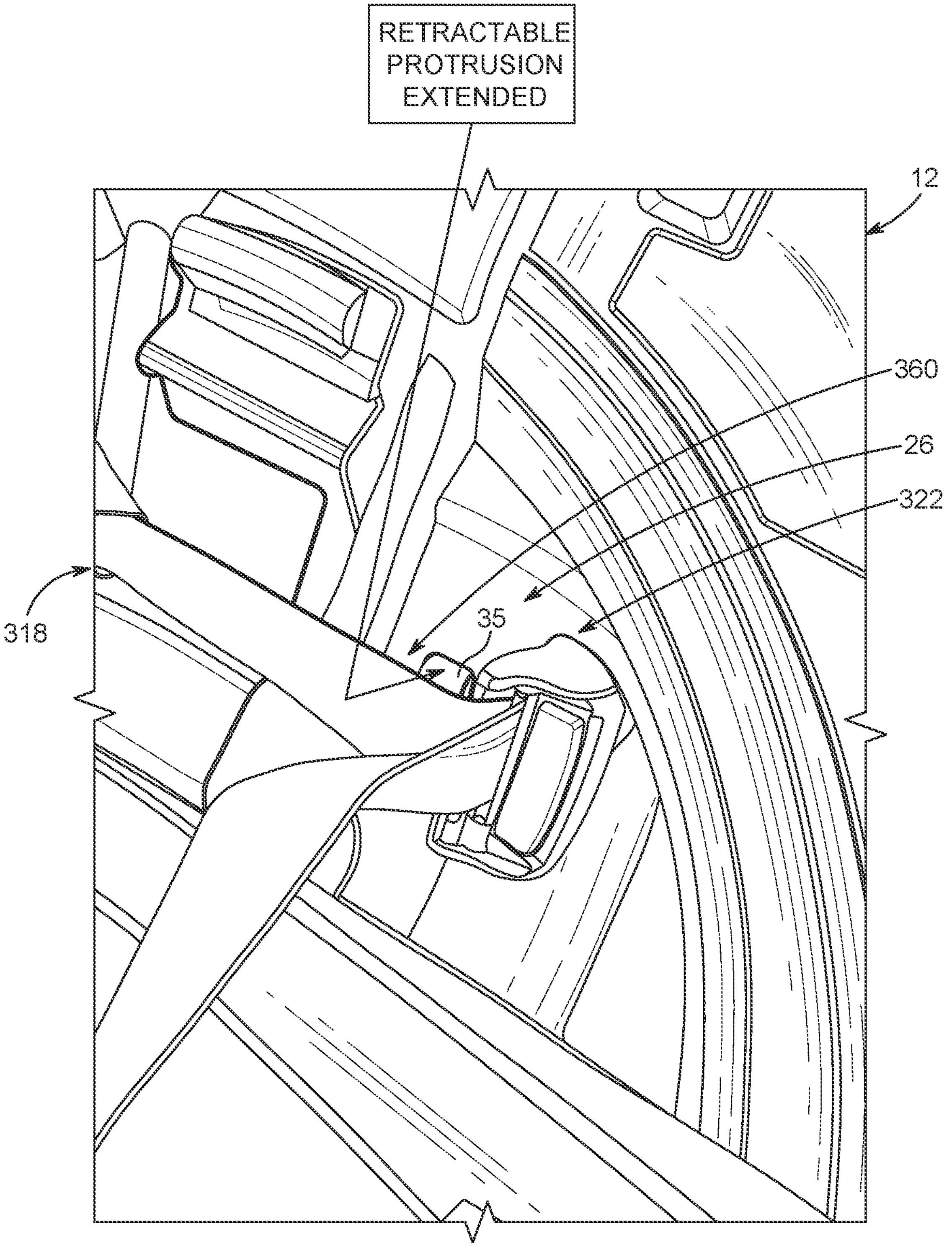
Figure 8:
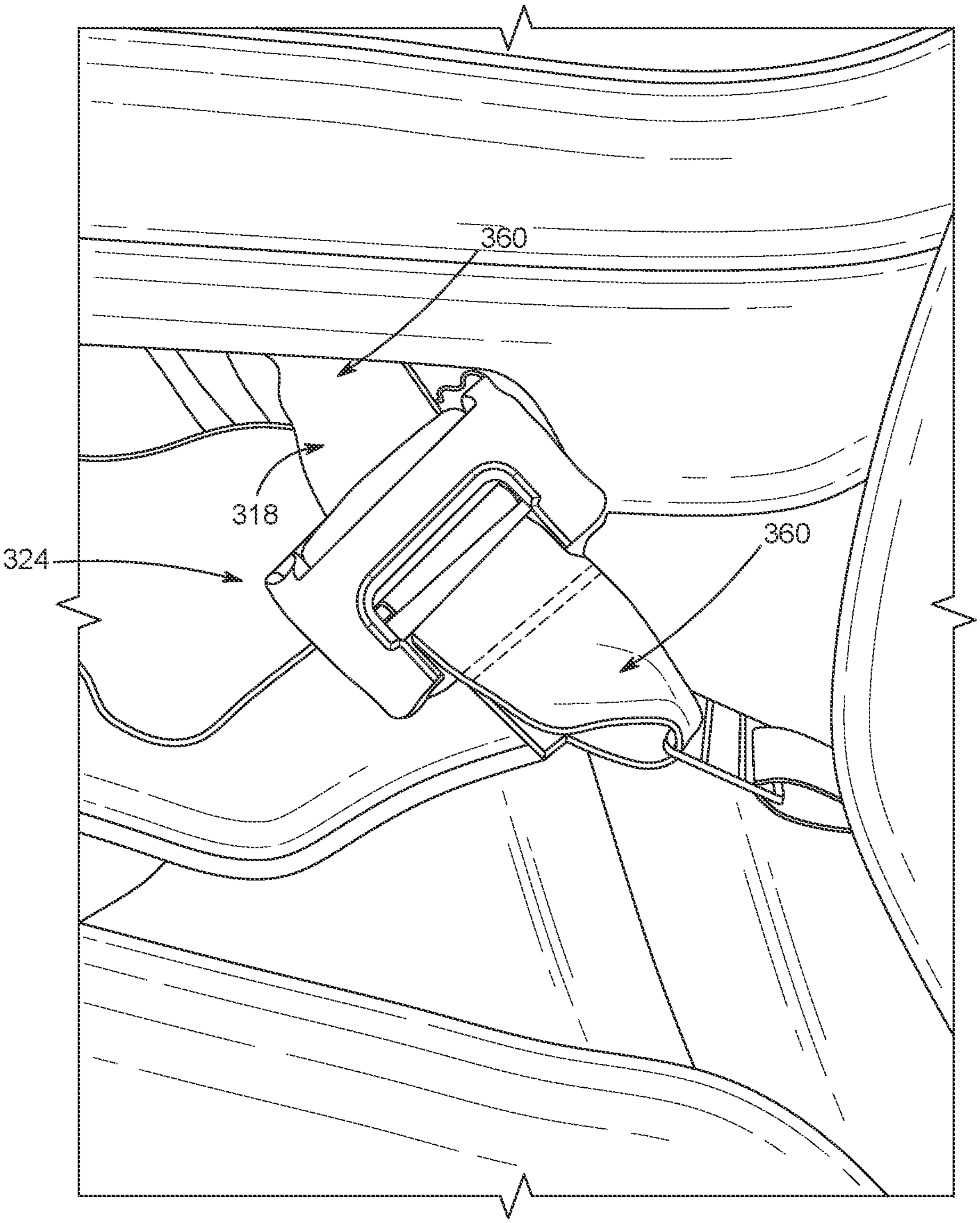

FIG. 7 is an enlarged view of a portion of FIG. 6 showing that the comparative attachment strap does not depress the retractable protrusion when installed on the vehicle seat thereby causing a false tension status indication to a user; and FIG. 8 is a side elevation view of the comparative attachment strap installed on the vehicle seat and showing that the comparative attachment strap includes an anchor belt with twists and bunches.

DETAILED DESCRIPTION

Figure 2:
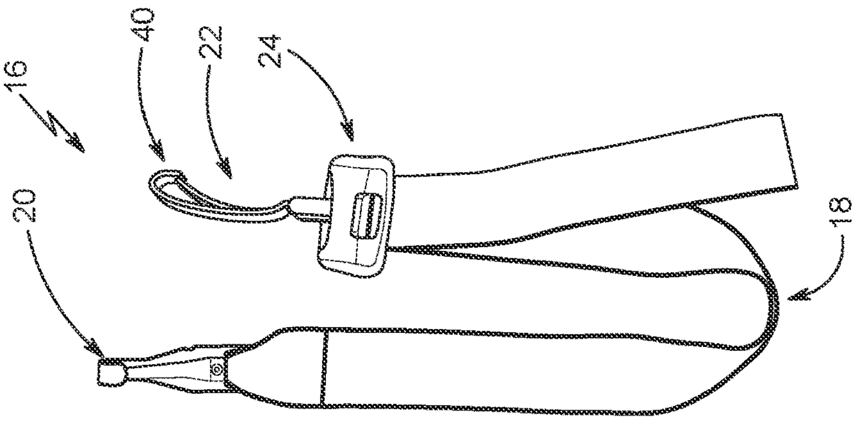
Figure 1:
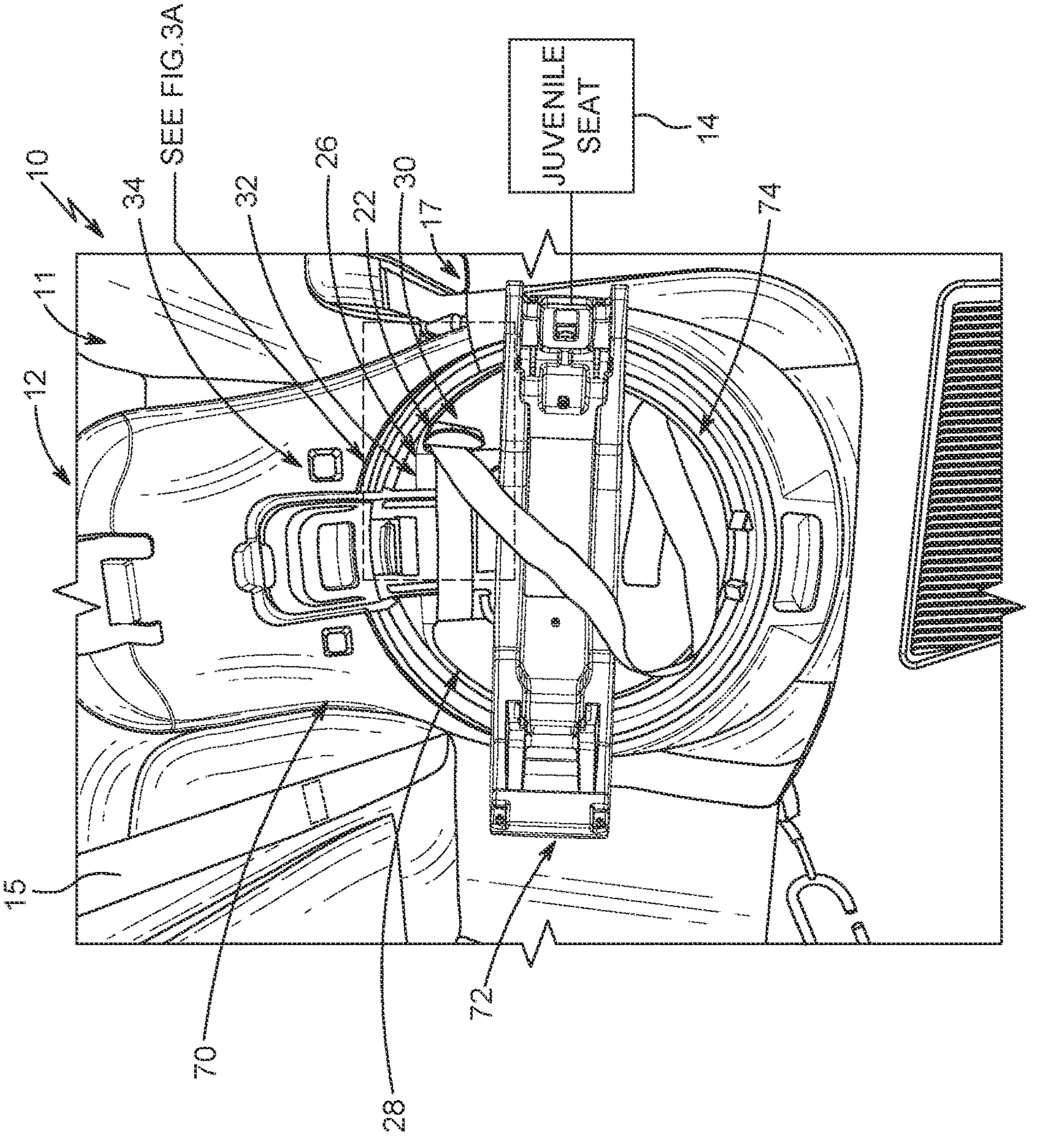

A child restraint 10 includes a seat base 12 and a juvenile seat 14 coupled to the seat base 12 as shown in FIG. 1. The seat base 12 is attachable to a vehicle seat 11 using an attachment strap 16, which may also be included in the child restraint 10. The attachment strap 16 includes an anchor belt 18 and first and second anchors 20, 22 coupled to the anchor belt 18. One of the anchors 20 is fixed to an end of the anchor belt 18 while the other of the anchors 22 includes an adjustment buckle 24 to allow movement of the anchor belt 18 relative to the anchor 22 to tighten and loosen the anchor belt 18 relative to the seat base 12.

The juvenile seat 14 is separable from the seat base 12 in the illustrative embodiment. However, in other embodiments, the seat base 12 and the juvenile seat 14 may be coupled to one another to form an integral seat shell adapted to attach to the vehicle seat 11 and hold a child. The seat base 12 is formed to include a belt path 26 that provides first and second belt path access ports 28, 30 on opposing lateral sides of the seat base 12 as shown in FIG. 1. The belt path 26 is defined at least partially by a belt-engagement surface 32 forming a part of the seat base 12. The anchor belt 18 is configured to engage the belt-engagement surface 32 and extend from the first belt access port 28 to the second belt access port 30. The first and second anchors 20, 22 reside outside of the belt path 26 and are configured to be secured to vehicle latch points 100, 102 formed or included in the vehicle seat 11. The anchor belt 18 is configured to be tightened and to apply pressure on the belt-engagement surface 32 of the seat base 12 to restrain the child restraint 10 against movement relative to the vehicle seat 11.

The anchor 22 with the adjustment buckle 24 is sized with a maximum length and/or width dimension to position the adjustment buckle 24 outside of the belt path 26 when the child restraint 10 is fully installed. These maximum length and width dimensions position the anchor belt 18 away from structures defining or adjacent to the belt path 26 so that the anchor belt 18 lies flush or flat on the belt-engagement surface 32 as shown in FIG. 1. The anchor 22 may be sized to provide means for positioning at least the lateral sides of the adjustment buckle 24 away from all surfaces defining or adjacent to the belt path 26 to cause the adjustment buckle 24 to be positioned in spaced apart relation to the surfaces so that the anchor belt 18 lies flat along the belt-engagement surface 32 from the first access port 28 to the second access port 30. As a result, the anchor belt 18 does not twist, bunch up, or disengage from the belt-engagement surface 32 between the first and second access ports 28, 30 and the adjustment buckle 24 is positioned outside of the belt path 26 as suggested in FIGS. 1, 3, and 4.

Figure 4:
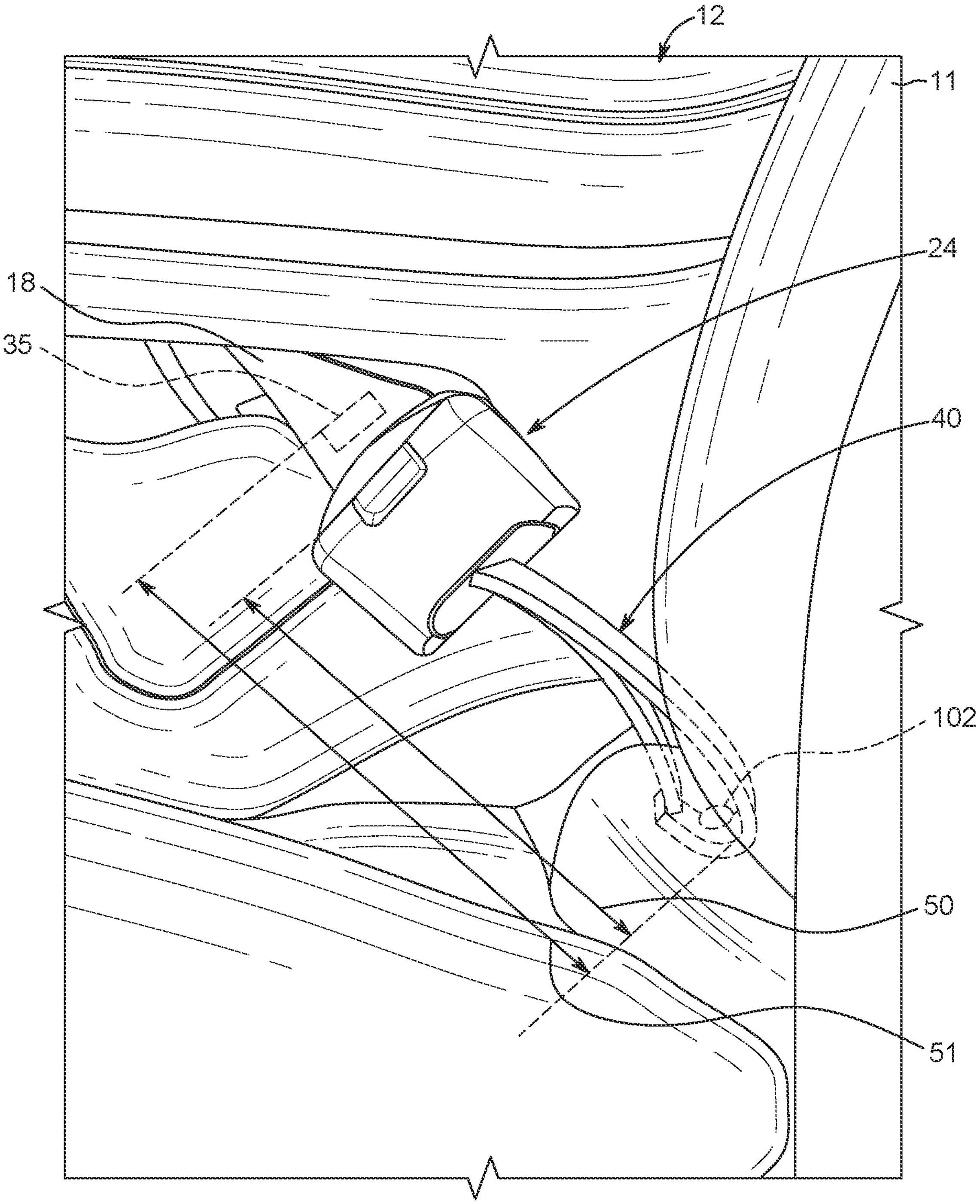
Figure 5A:
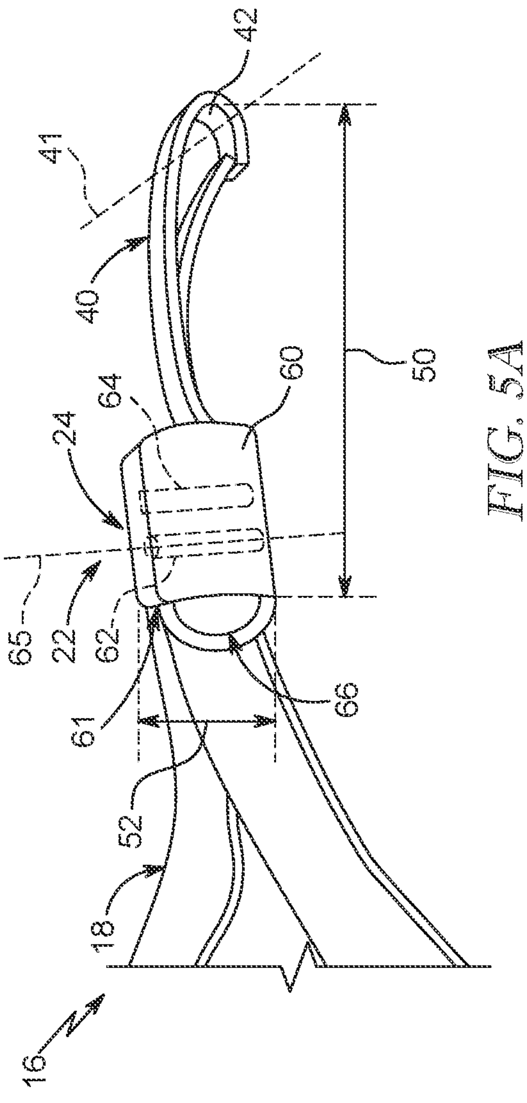
FIG. 5B is an enlarged view of another embodiment of a second anchor that can be used with the attachment strap of FIGS. 1-4, showing that the second anchor includes an adjustment buckle and an attachment hook coupled directly to the adjustment buckle and pivotable relative to the adjustment buck about a hook pivot axis.

In the illustrative embodiment, the anchor 22 includes an attachment hook 40 and the adjustment buckle 24 as shown in FIGS. 4 and 5A. The attachment hook 40 is formed integrally with and attached directly to the adjustment buckle 24 such that there is no webbing or strap therebetween. The adjustment buckle 24 is configured to rest flat against or parallel with a lateral side 12S of the seat base 12 when the second anchor 22 is installed on the vehicle seat 11 as a result of the structure and orientation of the attachment hook 40.

The adjustment buckle 24 includes a housing 60, a guide post 62 located within the housing 60, a clamp or cleat 64, and a release button 66 as shown in FIG. 5A. The anchor belt 18 enters and exits the housing 60 at an entrance/exit point 61. Inside the housing 60, the anchor belt 18 is routed around the guide post 60 and between the guide post 62 and the clamp/cleat 64. The clamp/cleat 64 is biased to exert a force on the anchor belt 18 to block loosening of the anchor belt 18. The release button 66 is configured to be actuated to move the clamp/cleat 64 so that the anchor belt can be loosened. The clamp/cleat 64 may be structured so that the anchor belt 18 can be tightened without actuating the release button 66.

The guide post 60 establishes an axis 65 about which the anchor belt 18 extends through the housing 60 as shown in FIG. 5A. The attachment hook 40 is structured and oriented so that the attachment hook 40 forms a generally J-shaped structure. The J-shaped structure has a curvature in a widthwise direction 52 of the anchor belt 18 and the adjustment buckle 24. The curvature of the attachment hook 40 extends about a hook curvature axis 41. The hook curvature axis 41 is substantially perpendicular to the axis 65 established by the guide post 62 to position the adjustment buckle 24 and the entrance exit point 61 of the anchor belt 18 in substantial parallel relation to the lateral side wall 12S of the seat base 12 when the attachment hook 40 is attached to the second latch point 102.

The second anchor 22 has a maximum length 50 and a maximum width 52. The length 50 extends from an engagement surface 42 of the attachment hook 40 to the exit point 61 where the anchor belt 18 exits the adjustment buckle 24. The width 52 extends between each lateral side of the adjustment buckle 24 perpendicular to the length 50. In one embodiment, the length 50 is no more than 4.5 inches and the width 52 is no more than 2.4 inches. These dimensions may be critical in providing the means described above.

Figure 5B:
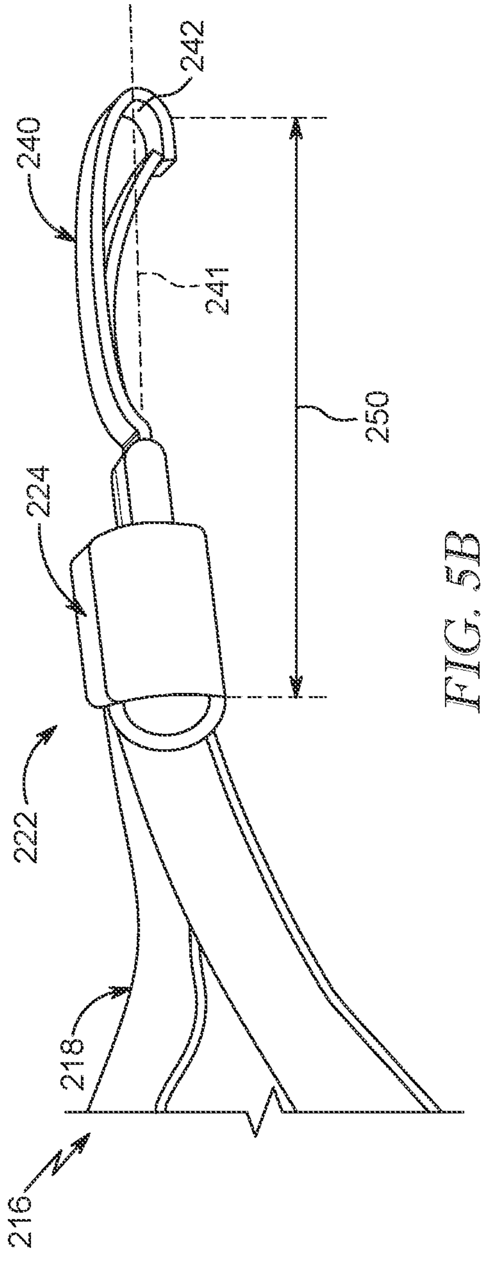

Another embodiment of an anchor 222 is shown in FIG. 5B and includes a rotatable attachment hook 240 and an adjustment buckle 224. The anchor 222 is substantially similar to anchor 22 except that the attachment hook 240 can rotate about an axis 241.

Figure 3B:
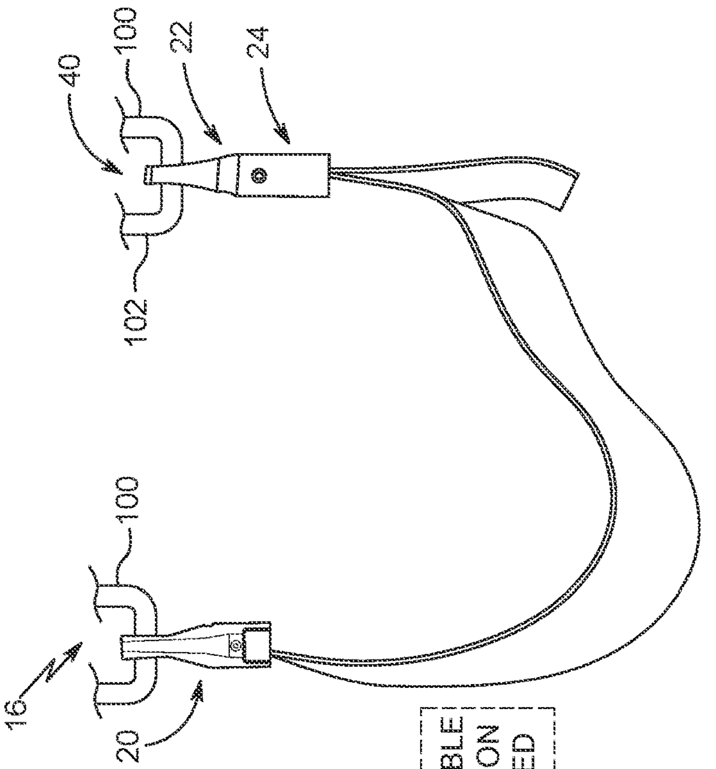
Figure 3A:
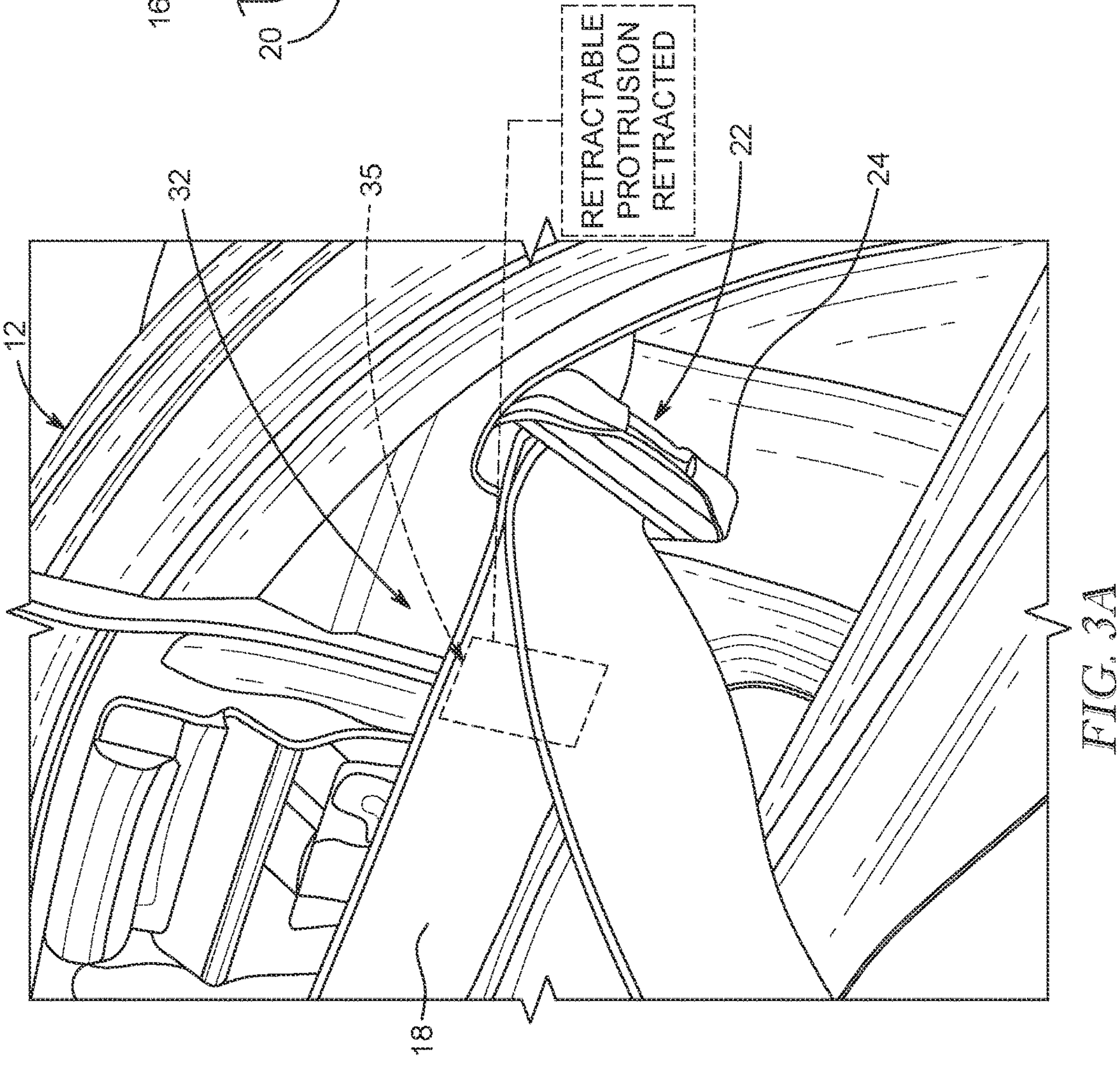

In the illustrative embodiment, the seat base 12 further includes a tension indicator 34 having at least one retractable protrusion 35 that extends into the belt path 26 as suggested in FIGS. 3 and 4 and shown in FIG. 7. The retractable protrusion 35 is configured to be engaged by the anchor belt 18 along the belt-engagement surface 32 to cause the retractable protrusion 35 to change from an extended position to a retracted position when there is sufficient pressure on the belt-engagement surface 32 as shown in FIG. 1. Accordingly, the retractable protrusion forms part of the belt-engagement surface 32. Movement of the retractable protrusion 35 to the retracted position displays an indication on the seat base 12 that the anchor belt has sufficient tension. Other attachment straps, such as comparative attachment strap 310 described below and shown in FIGS. 6-8, include anchors with dimensions larger than the dimensions discussed above. These anchors may cause the anchor belt 18 to deform (i.e. twist or bunch up) across the belt-engagement surface 32. In some cases the anchor belt 18 in these comparative attachment straps 310 may avoid the retractable protrusion 35, thereby providing a false indication as suggested in FIG. 6.

In the illustrative embodiment, the maximum length 50 of the second anchor 22 included in the attachment strap 10 is less than a distance 51 defined from the belt-engagement surface 32 at the retractable protrusion 35 to the second latch point 102. This structure of the second anchor 22 positions all surfaces of the second anchor 22 away from the belt path 26 so that the anchor belt 18 can rest flat on the belt-engagement surface 32 and the retractable protrusion 35.

Referring to FIGS. 7 and 8, the comparative attachment strap 310 is shown including an anchor 322 that is sized without the length 50 and width 52 dimensions and without the other structures of second anchor 22 discussed above. In particular, the anchor 322 has a longer length and includes an adjustment buckle 324 with a larger width than the anchors discussed above and shown in FIGS. 1-5. This larger buckle 324 extends into a belt path 26 of the seat base 12 and causes anchor belt 318 to deform and cause folds 360 in the belt 318. In some embodiments, this may cause the belt 318 to miss the retractable protrusion 35. FIG. 8 shows a lateral side of the adjustment buckle 324 contacting a surface of the seat base 12 defining the belt path 26 which causes twisting of the anchor belt 318 and the folds 360 to form. The comparative attachment strap 310 also includes a strip of webbing between the adjustment buckle and the attachment hook as shown in FIG. 8. This arrangement and structure can cause folds or twists 360 to form in this strip of webbing as well.

In illustrative embodiments, the seat base 12 includes a seat base foundation 70 and a seat orientation controller 72 as shown in FIG. 1. The seat base foundation 70 is formed to include the belt path 26 and is configured to remain stationary on the vehicle seat 11. The seat orientation controller 72 is fixed to the seat base foundation 70 and is configured to attach the juvenile seat 14 to the seat base 12. The seat orientation controller 72 also allows movement of the juvenile seat 14 relative to the seat base foundation 70. For example, the seat orientation controller 72 can be unlocked from the seat base foundation 70 and rotated relative to the seat base foundation 70 to change the juvenile seat 14 from a forward-facing arrangement to a rearward-facing arrangement.

The seat orientation controller 72 resides partially within a concave rotation space 74 formed in the seat base foundation 70. The belt path 26 forms a part of the concave rotation space 74. The second anchors 22, 222 are structures to position the anchors outside of the concave rotation space 74 so that the seat orientation controller 72 and the juvenile seat 14 are free to rotate relative to the seat base foundation 70 between the forward-facing arrangement and the rearward-facing arrangement without interference with the second anchor 22, 222.

The child restraint 10 and the vehicle seat 11 may form a child restraint system in some embodiments. The vehicle seat 11 further includes seat cushions 13, a seat belt 15, and a buckle 17 as shown in FIG. 1. The first and second latch points 100, 102 are fixed to structural members of the vehicle seat 11 and are embedded in the seat cushions 13 laterally between the seat belt 15 and the buckle 17. The seat belt 15 and the buckle 17 are separate from the attachment strap 16 and are not used to retain the child restraint 10 to the vehicle seat 11.

The invention claimed is:

1. A child restraint for attachment to a vehicle seat to retain the child restraint to the vehicle seat, the child restraint comprising:

a seat base adapted to rest on the vehicle seat, the seat base including: (i) a seat base foundation formed to include a belt path defined at least partially by a belt-engagement surface, the belt-engagement surface having a first end and an opposite, second end, and (ii) a tension indicator including at least one retractable protrusion positioned within the belt path between the first and second ends of the belt-engagement surface, a juvenile seat adapted to hold a child and configured to be attached removably to the seat base, and an attachment strap configured to secure the seat base to the vehicle seat to retain the seat base and the juvenile seat to the vehicle seat, the attachment strap comprising an anchor belt configured to engage the belt engagement surface between the first end of the belt-engagement surface to the second end of the belt-engagement surface, a first anchor coupled to an end of the anchor belt and configured to engage with a first latch point included in the vehicle seat, and a second anchor coupled to the anchor belt and configured to engage with a second latch point included in the vehicle seat and spaced apart from the first latch point, the second anchor including an attachment hook having an engagement surface configured to contact and grip the second latch point and an adjustment buckle coupled with the anchor belt to change a length of the anchor belt between the first anchor and the second anchor to allow tightening and loosening of the anchor belt relative to the first and second anchors, wherein the anchor belt is configured to engage the retractable protrusion and cause the retractable protrusion to change from an extended position to a retracted position after attachment of the first anchor to the first latch point and the second anchor to the second latch point and after tightening the anchor belt to exert a predetermined pressure on the belt-engagement surface, and wherein the second anchor has a maximum length defined from the engagement surface of the attachment hook to an exit point on the adjustment buckle where the anchor belt exits the adjustment buckle and extends toward the second end of the belt-engagement surface, and the maximum length is less than a distance defined from the belt-engagement surface at the retractable protrusion to the second latch point.

2. The child restraint of claim 1, wherein the adjustment buckle of the second anchor has a maximum width that is less than or equal to a width of the second end of the belt-engagement surface.

3. The child restraint of claim 2, wherein the maximum length is less than or equal to about 4.5 inches and the maximum width is less than or equal to about 2.4 inches so that the adjustment buckle resides completely out of the belt path when the attachment strap is installed on the vehicle seat.

4. The child restraint of claim 1, wherein anchor belt is routed around a guide post included in the adjustment buckle and an axis provided by the guide post, and wherein the attachment hook has a curvature extending around a hook curvature axis arranged substantially perpendicular to the axis of the guide post.

5. The child restraint of claim 4, wherein the attachment hook is pivotable relative to the adjustment buckle about a hook pivot axis, the hook pivot axis extending perpendicular to the hook curvature axis.

6. The child restraint of claim 1, wherein the seat base further includes a tension indicator including at least one retractable protrusion positioned within the belt path between the first and second ends of the belt-engagement surface and configured to engage the anchor belt and cause the retractable protrusion to change from an extended position to a retracted position when there is sufficient pressure on the belt-engagement surface by the anchor belt to indicate when the anchor belt is tightened.

7. The child restraint of claim 6, wherein the retractable protrusion has a forward-facing surface positioned to engage the anchor belt, and wherein the forward-facing surface is spaced apart from the first and second latch pointes by a second distance greater than or equal to the distance between the second end of the belt-engagement surface and the second latch point.

8. The child restraint of claim 1, wherein the adjustment buckle includes a housing having the exit point, a clamp coupled to the housing and configured to engage the anchor belt within the housing to restrict movement of the anchor belt relative to the housing, and a release button coupled to the clamp and configured to move the clamp to a released position so that the anchor belt can slide relative to the housing to loosen the attachment strap.

9. The child restraint of claim 1, wherein the attachment hook is coupled directly to the housing of the adjustment buckle such that there is no webbing or strap material between the attachment hook and the adjustment buckle.

10. A child restraint for attachment to a vehicle seat of a vehicle, the child restraint comprising:

- a seat shell adapted to rest on the vehicle seat and adapted to hold a child for transportation in the vehicle, the seat shell being formed to include a belt path defined at least partially by a belt-engagement surface, the belt-engagement surface having a first end and an opposite, second end, and
- an attachment strap configured to secure and retain the seat shell to the vehicle seat, the attachment strap comprising an anchor belt configured to engage the belt engagement surface between the first end of the belt-engagement surface to the second end of the belt-engagement surface, a first anchor coupled to an end of the anchor belt and configured to engage with a first latch point fixed to the vehicle seat, and a second anchor coupled to the anchor belt and configured to engage with a second latch point fixed to the vehicle seat and spaced apart from the first latch point,
- wherein the second anchor includes an attachment hook having an engagement surface configured to contact and grip the second latch point and an adjustment buckle coupled with the anchor belt to allow tightening and loosening of the anchor belt relative to the second anchor, and
- wherein the second anchor has a maximum length defined from an engagement surface of the attachment hook engaged with the second latch point to an exit point where the anchor belt exits the adjustment buckle and extends toward the second end of the belt-engagement surface, and the maximum length is less than a distance defined between the second end of the belt-engagement surface and the second latch point.

11. The child restraint of claim 10, wherein the adjustment buckle of the second anchor has a maximum width that is less than or equal to a width of the second end of the belt-engagement surface.

12. The child restraint of claim 11, wherein the maximum length is less than or equal to 4.5 inches and the maximum width is less than or equal to 2.4 inches so that the adjustment buckle resides completely out of the belt path when the attachment strap is installed on the vehicle seat.

13. The child restraint of claim 10, wherein anchor belt is routed around a guide post included in the adjustment buckle and an axis provided by the guide post, and wherein the attachment hook has a curvature extending around a hook curvature axis arranged substantially perpendicular to the axis of the guide post.

14. The child restraint of claim 13, wherein the attachment hook is coupled to the adjustment buckle to pivot relative to the adjustment buckle about a hook pivot axis and the hook pivot axis is arranged to extend perpendicular to the hook curvature axis.

15. The child restraint of claim 10, wherein the seat base further includes a tension indicator including at least one retractable protrusion positioned within the belt path between the first and second ends of the belt-engagement surface and configured to engage the anchor belt and cause the retractable protrusion to change from an extended position to a retracted position when there is sufficient pressure on the belt-engagement surface by the anchor belt to indicate when the anchor belt is tightened.

16. The child restraint of claim 15, wherein the retractable protrusion has a forward-facing surface positioned to engage the anchor belt, and wherein the forward-facing surface is spaced apart from the first and second latch pointes by a second distance greater than or equal to the distance between the second end of the belt-engagement surface and the second latch point.

17. The child restraint of claim 10, wherein the adjustment buckle includes a housing having the exit point, a clamp coupled to the housing and configured to engage the anchor belt within the housing to restrict movement of the anchor belt relative to the housing, and a release button coupled to the clamp and configured to move the clamp to a released position so that the anchor belt can slide relative to the housing to loosen the attachment strap.

18. The child restraint of claim 17, wherein the attachment hook is coupled directly to the housing of the adjustment buckle such that there is no webbing or strap material between the attachment hook and the adjustment buckle.

19. An attachment strap configured to secure a child restraint to a vehicle seat, the attachment strap comprising:

- an anchor belt configured to engage a belt-engagement surface of the child restraint,
- a first anchor coupled to an end of the anchor belt and configured to engage with a first latch point included in the vehicle seat, and
- a second anchor coupled to the anchor belt and configured to engage with a second latch point included in the vehicle seat and spaced apart from the first latch point,
- wherein the second anchor includes an attachment hook having an engagement surface configured to contact and grip the second latch point and an adjustment buckle coupled directly to the attachment hook and with the anchor belt and configured to change a length of the anchor belt between the first anchor and the second anchor to allow tightening and loosening of the anchor belt relative to the first and second anchors, and wherein anchor belt is routed around a guide post included in the adjustment buckle and an axis provided by the guide post, and wherein the attachment hook has a curvature extending around a hook curvature axis arranged substantially perpendicular to the axis of the guide post.

20. The attachment strap of claim 19, wherein the attachment hook is coupled to the adjustment buckle to pivot relative to the adjustment buckle about a hook pivot axis and the hook pivot axis is arranged to extend perpendicular to the hook curvature axis.

* * * * *